L. W. LUELLEN.
COIN CONTROLLED APPARATUS.
APPLICATION FILED AUG. 24, 1908.
946,242.
Patented Jan. 11, 1910.
6 SHEETS—SHEET 2.
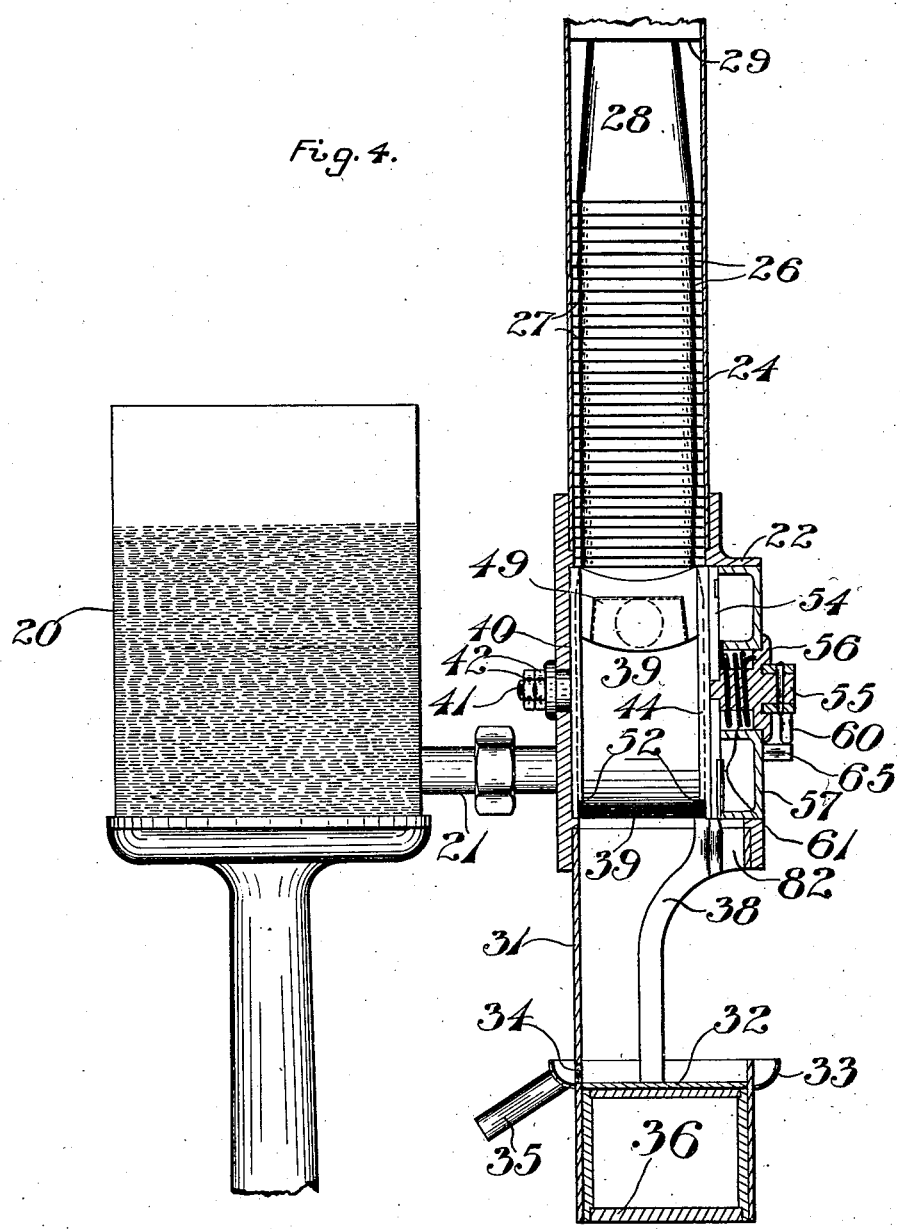

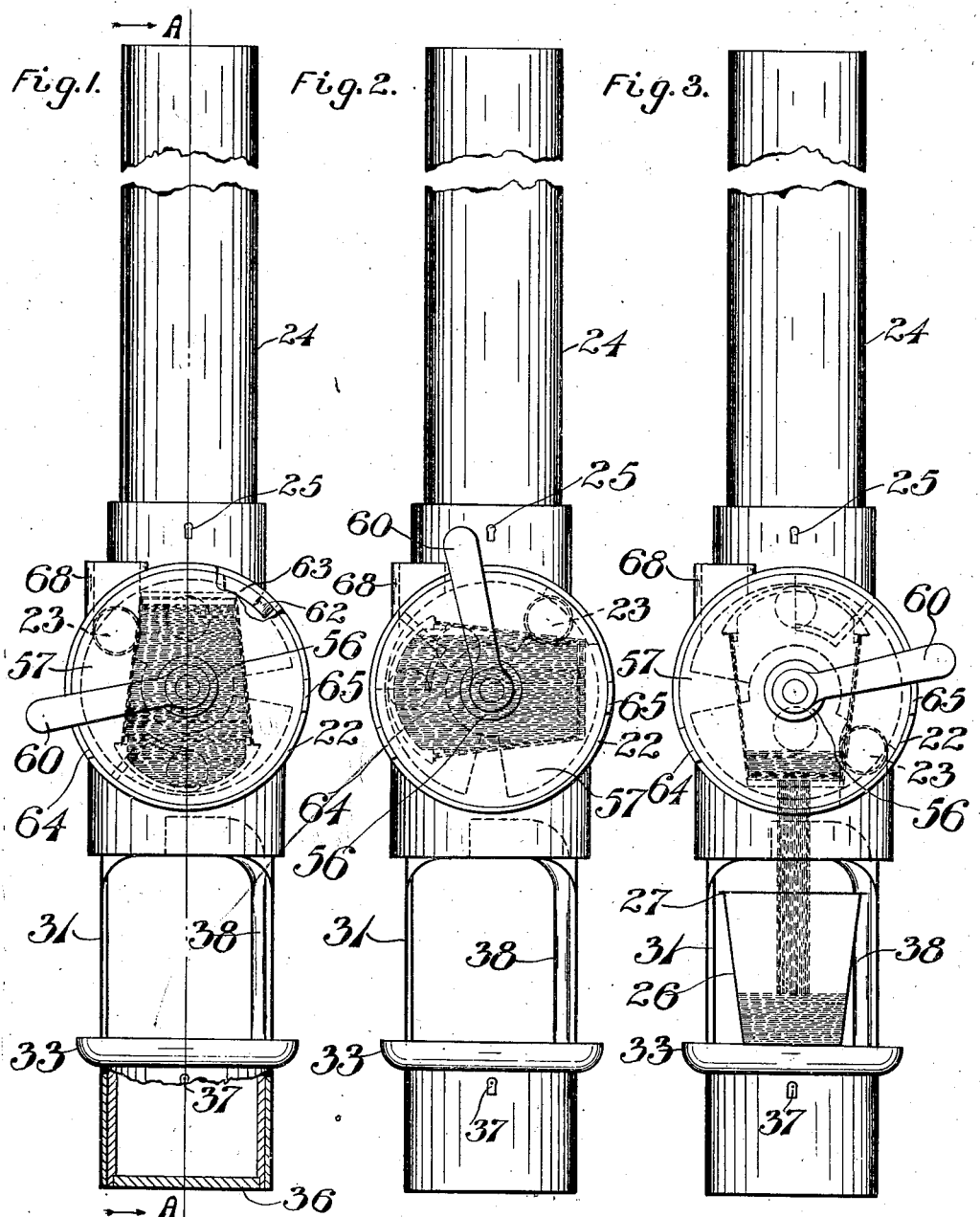

L. W. LUELLEN.
COIN CONTROLLED APPARATUS.
APPLICATION FILED AUG. 24, 1908.

946,242.

Patented Jan. 11, 1910.
6 SHEETS—SHEET 3.

Witnesses.
Raphael G Blanc
James E. Jenink

Inventor.
Lawrence W. Luellen
by Sylvanus H. Cobb,
Attorney.

L. W. LUELLEN.
COIN CONTROLLED APPARATUS.
APPLICATION FILED AUG. 24, 1908.
946,242.
Patented Jan. 11, 1910.
6 SHEETS—SHEET 5.
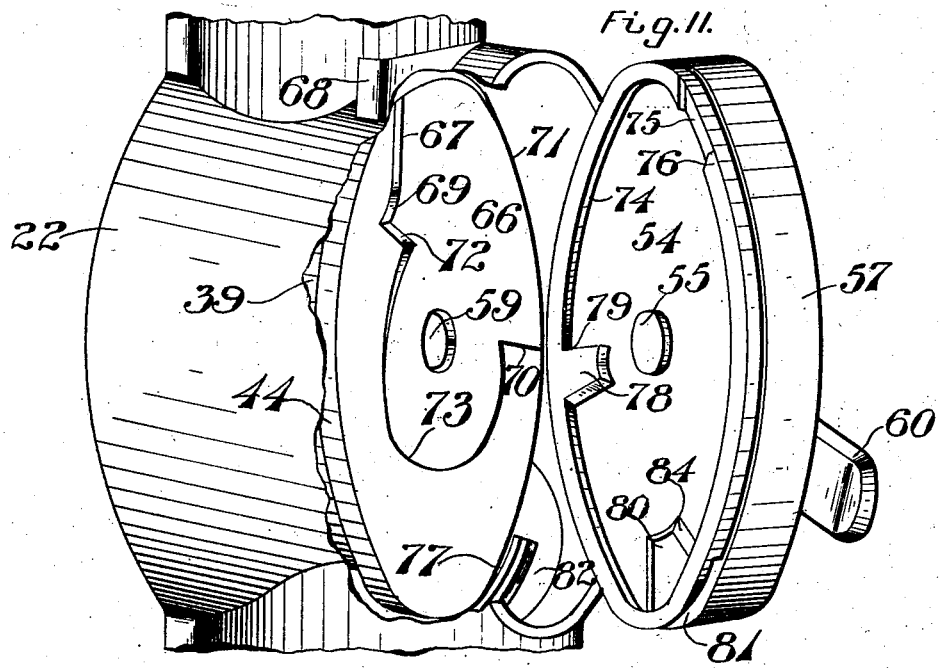
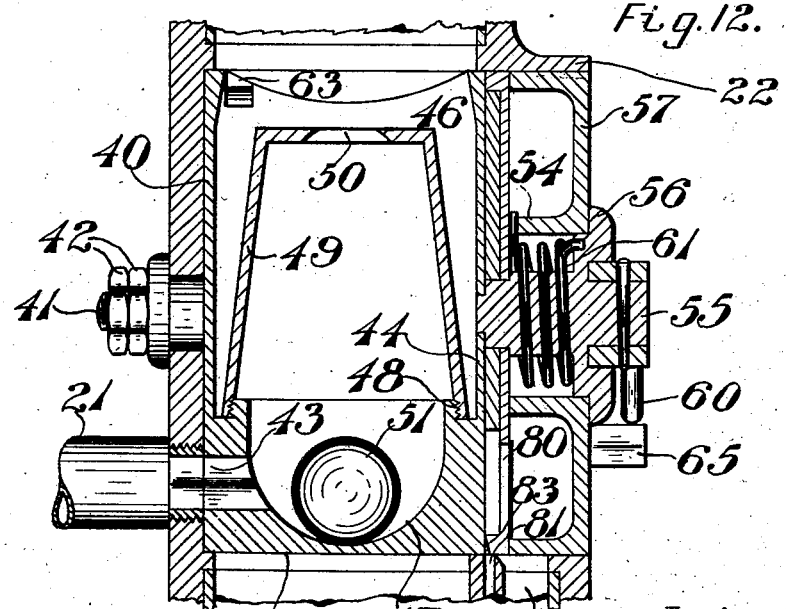
Witnesses.
Raphael G. Blanc.
James E. Nevins
Inventor
Lawrence W. Luellen
by Sylvanus H. Cobb.
Attorney.

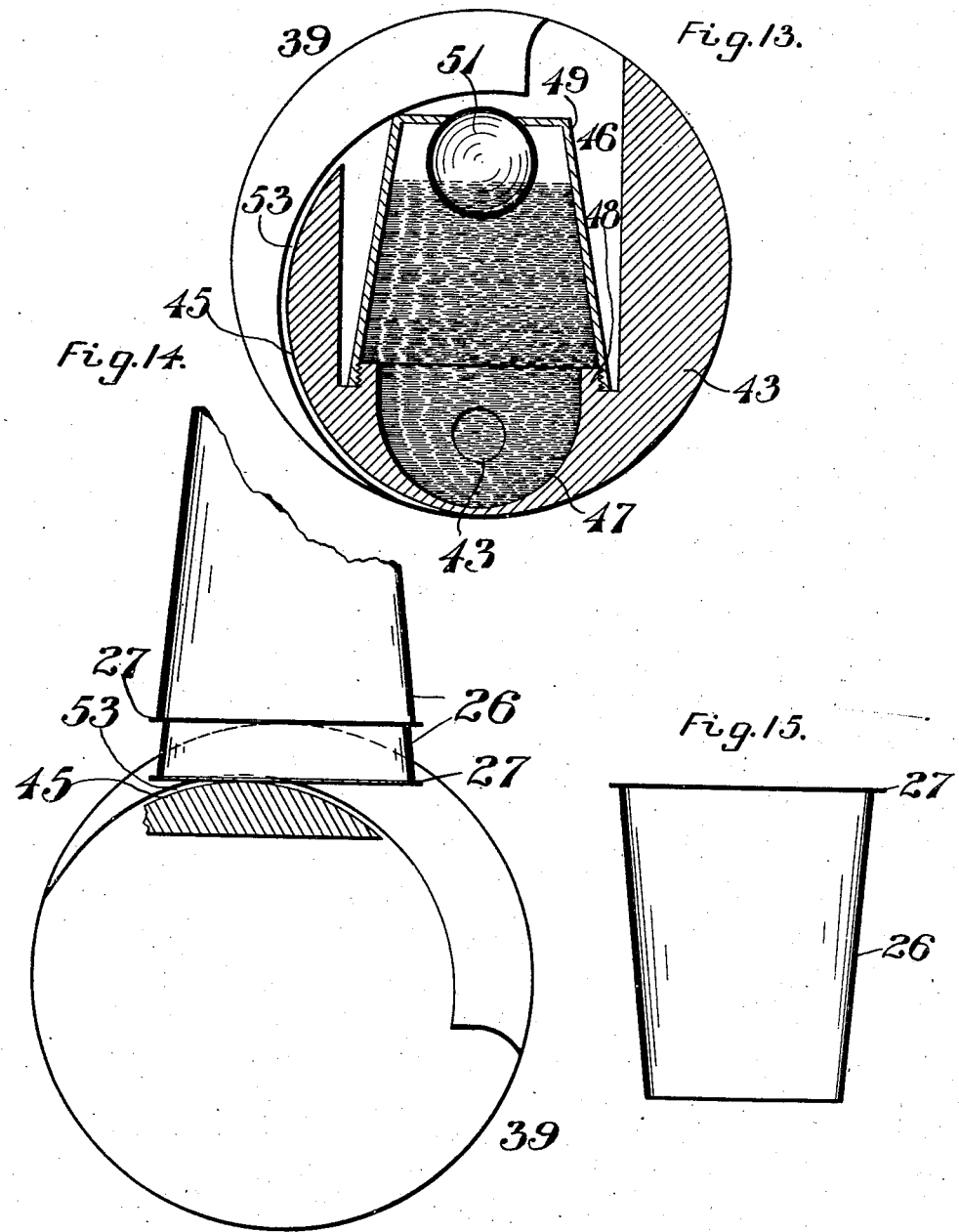

UNITED STATES PATENT OFFICE.

LAWRENCE W. LUELLEN, OF NEWTON, MASSACHUSETTS.

COIN-CONTROLLED APPARATUS.

946,242.

Specification of Letters Patent.   Patented Jan. 11, 1910.

Application filed August 24, 1908.   Serial No. 450,037.

*To all whom it may concern:*

Be it known that I, LAWRENCE W. LUEL-LEN, a citizen of the United States, residing at Newton, in the county of Middlesex and State of Massachusetts, have invented a new and useful Coin-Controlled Apparatus, of which the following is a specification.

My invention relates to apparatus for vending merchandise, and more especially to coin-controlled machines for dispensing beverages or other fluids and containers therefor.

The principal objects of the invention are to provide a simple and efficient apparatus for this purpose, in which a cup or container is withdrawn from a supply, which cups are so stored as to be guarded against the accumulation of dirt, filled with the fluid and delivered to the purchaser in an aseptic condition, as a result of a single operation.

Figure 5:
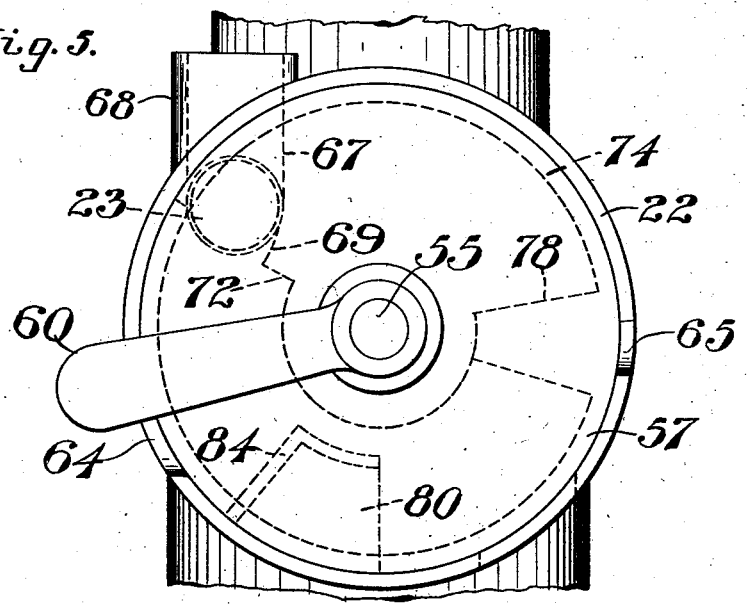
Figure 6:
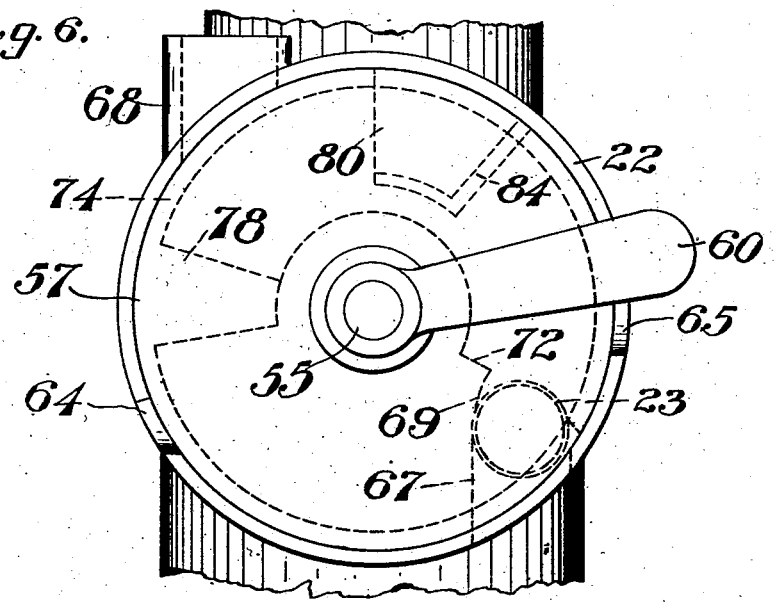
Figure 7:
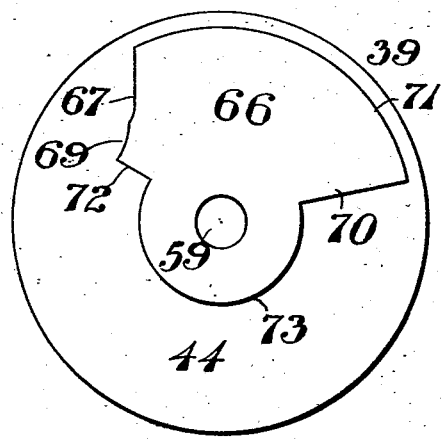
Figure 8:
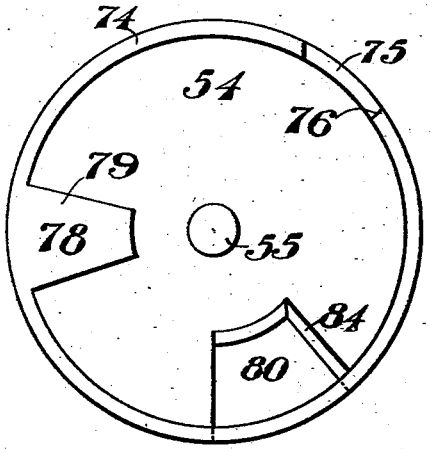
Figure 9:
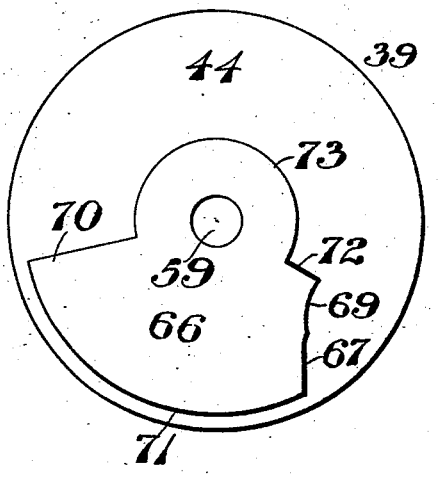
Figure 10:
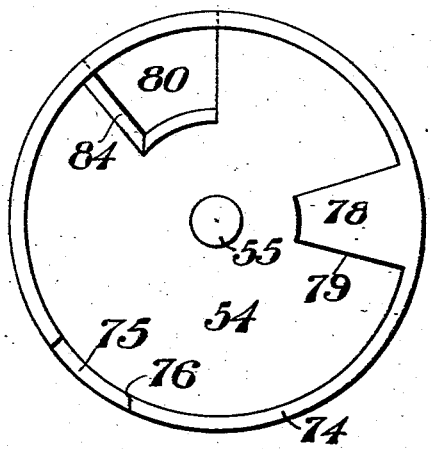

In the accompanying drawings is illustrated one embodiment of my invention. Here Figure 1 shows a front elevation of the improved vending-machine, parts being broken away; Figs. 2 and 3 are similar views showing successive positions of the delivery-drum; Fig. 4 is a partial section on the line A—A of Fig. 1; Fig. 5 is a front elevation of the casing, with the coöperating elements of the delivery-drum and its actuating disk, together with a coin, indicated in dotted lines in their initial position; Fig. 6 is a view of the same character but with the elements in their final or delivery position; Figs. 7 and 8 illustrate the opposing faces of the delivery-drum and its actuating disk, respectively, these being represented in their normal position; Figs. 9 and 10 are similar views, with the elements at their opposite extreme of movement; Fig. 11 is a perspective view of the casing and drum, with the front plate and the actuating disk turned at an angle therefrom; Fig. 12 is a central vertical longitudinal section through the casing; Fig. 13 is a transverse section through the center of the delivery-drum; Fig. 14 is a partial section through the drum, showing the manner in which it engages the cups, and Fig. 15 is a side elevation of one of said cups.

Similar characters designate like parts throughout the several figures of the drawings.

I have shown my improved vending apparatus supported in proximity to a merchandise-receiver 20, which, in the present instance, consists of a tank or reservoir for liquid, and has an outlet-passage furnished by a pipe 21 communicating with an opening in the rear wall of a casing 22. This casing, which carries the other elements of the apparatus, is cylindrical, being situated with its axis extending horizontally and supported in any convenient manner. It is provided at its top with an opening having about it a socket in which rests the lower extremity of a vertical receiver 24, preferably of tubular form, for a supply of merchandise-containers. The receiver may be secured in the socket by a lock indicated at 25. When the apparatus is to be used for the dispensing of liquid the containers will consist of cups 26, of the ordinary frusto-conical type and of some light material such as paraffin or other water-proof paper. Each cup has about its large open end a projection furnished by an annular flange 27. The supply of cups is placed in the receiver in a closely nested series, the flanges being separated from one another by comparatively small spaces, and with their open sides down, this preventing dirt from entering them while they are thus stored. The cups are supported at the bottom of the receiver in a manner which will later be made clear. To insure downward movement of the cups, as they are delivered one by one, the series is preferably weighted by a follower 28, which is cup-shaped and which fits upon the upper cup of the series. The follower has at its outer or smaller extremity a flange 29 fitting the bore of the receiver, whereby the stack is prevented from being deflected laterally.

Below the casing, in alinement with the receiver, is a cup and coin-box support furnished by a depending cylindrical extension 31, having at a suitable distance beneath the casing a shelf 32, about which is an opening through the casing of sufficient size to permit a cup to be removed therefrom. An annular trough 33 surrounds the shelf and receives spattered liquid and the waste from the shelf, the latter escaping through an opening 34. The trough is drained by a discharge pipe 35. The coin-box 36 is mounted at the end of the extension 31 and is removable, having a lock 37 which secures it in place. Extending from a slot in the top of the coin-box and along the wall of the portion 31 is a coin-chute 38, which at its upper end communicates with the casing.

Rotatable in the casing 22 is a single device common to both the cups and liquid by which these are delivered or rendered accessible to the purchaser. This delivery device comprises a generally cylindrical drum 39, from the inner end wall 40 of which a spindle 41 projects through and has a bearing in an axial opening in the rear-wall of the casing, the end of this spindle being threaded to receive nuts 42 which draw the drum-wall toward that of the casing and retain the drum against longitudinal movement. In the wall 40 is an inlet opening 43 normally registering with the discharge-opening of the pipe 21 and operating, when the disk is turned, as a valve controlling the flow from the reservoir. Between the rear wall of the drum and its front wall 44 the exterior of the intermediate or body portion is curved gradually inward so that the surface at 45 is eccentric to the axis (Figs. 13 and 14 of the drawing). In the body of the drum at the end of the surface 45 is a recess or pocket 46 of considerable size having a cylindrical side wall, and at the bottom a bowl-like depression 47 communicating at one side with the inlet opening 43. The depression 47 has about it, projecting into the pocket, a threaded flange 48, and upon this flange is screwed a hollow holder 49, similar in its general shape to one of the cups and in its normal position in alinement with the cup-receiver. The depression and holder together serve as a liquid-receptacle having a definite capacity. The liquid entering the receptacle through the opening 43, if unrestrained, would pass through a discharge-opening or passage 50 situated at the center of the outer wall of the holder, but this is prevented by a valve member 51 of buoyant material, preferably of rubber, in the form of a hollow sphere which floats upon the surface of the liquid within the receptacle and as said liquid rises seats itself against the opening. The integrity of the closure increases with the pressure and remains effective after the holder has been turned through a considerable angle, say of ninety degrees or more from the vertical.

The length of the drum and the thickness of its walls or heads where they project radially at opposite sides of the surface 45 are such that the inner edges of said heads extend below the cup-receiver 24 at each side. Therefore the lower or terminal cup of the series is supported by the contact of its edge and flange 27 with the heads. At 52 (Fig. 4), adjacent to the beginning of the eccentric surface, the projecting edges of the heads narrow so that the cup flanges may pass between them in a certain position of the drum; and when this occurs said flanges may enter opposite grooves 53—53 in the heads (Figs. 13 and 14), these grooves following the surface 45 and their outer walls extending over the recess 46. Said walls therefore diverge from the edges of the heads, which are concentric to the axis, and furnish cam members, which by their engagement with the flanges 27 serve to withdraw the cups one by one from the series, as will later be made plain.

Coöperating with the forward end of the drum, though capable of independent movement, is an actuating-disk or member 54, rotatable in the casing and having a central spindle 55 provided with an enlargement 56 bearing in a plate 57 which closes the front of the casing, except for an opening through which the spindle extends. The spindle 55 at its inner end furnishes a bearing for the adjacent head 44 of the drum, there being an opening 59 in said head for its reception (Fig. 11). Secured on the spindle outside the plate is a handle or lever 60, the manipulation of which effects the operation of the delivery device. In a chamber between the disk 54, the plate 57 and the spindle is a chamber in which is situated a spring 61, here shown as of the spiral type, attached at one end to the plate and at its opposite end to the spindle. The spring is adapted to exert both expansive and torsional stresses, the effect of the first being to force the rear wall of the drum into close contact with the opposite wall of the casing, these being preferably ground to a fit, and thus guarding against leakage into the casing from the delivery pipe. By its torsion the spring holds the disk and drum in their inactive positions and returns them after each operation. The correct limit of movement of the drum to its normal position is assured by a device which may consist of a pin 62 projecting from the casing 22 into a slot 63 extending in one direction from the recess 46 (Figs. 1 and 12). The position of the closed end of the slot is such that the contact of the pin with it prevents the rotation of the drum beyond the proper position of rest. The travel of the actuating disk is limited in both directions by stops 64 and 65 carried by the outer end of the casing for coöperation with the handle, and determining, respectively, the normal position under the tension of the spring 61 and the ultimate position for delivery under the manipulation of the operator.

Referring particularly to Figs. 5 to 10, inclusive, and Fig. 11, upon the outer or front face of the head 44 of the drum is a projection 66, the function of which is to furnish certain operating faces, and except for these and a passage, as will later be particularly defined, its shape and extent is not important and it may be in one or more sections. The projection has a surface 67 at one edge, this being inclined to a radius of the head. The surface 67 normally continues one side of a slot in the receiving tube 68 which furnishes a coin-ingress opening through the casing, the size of the tube being such that it will just admit the coin by which it is desired the machine shall be operated. The surface serves as a directing wall or abutment to a coin-engaging surface 69, inclined or curved beneath the slot at an angle to the surface 67. Separated in a clock-wise direction from the coin-abutment and engaging surfaces of the projection is a surface 70 at the opposite edge of the projection 66, this lying along a radius of the head. Its purpose will later appear. Between these opposite faces the projection at its outer edge 71 is arc-shaped, it being situated a short distance from the periphery of the head 44. From the inner extremity of the surface 69 the projection is cut back at 72 toward the axis of the drum, and from there to the inner end of the surface 70 the projection follows an arc 73 of considerably less diameter than at 71 and upon the opposite side of the axis.

The opposing face of the disk 54 has at its periphery an annular flange or projection 74, lying in close proximity to the head 44 of the drum and movable in the segmental space between the edge 71 of the projection 66 and the outside of the head 44. Extending partly through the lateral dimension of the flange and entirely through it radially is an opening 75. When the handle 60 is against the stop 64 the surface 76 at one end of this opening is situated just at the left-hand extremity of the coin-ingress slot, and the surface 67 upon the drum continues the opposite side to the surface 69. The relation of the disk-surface 76 to the surface 69 of the drum is such that when a coin of the proper size to operate the machine falls between them they both engage and retain it, locking the disk and drum together for the forward or delivery movement. When the handle 60 through which the disk is operated reaches the stop 65, the opening 75 and the coin held between the surfaces 69 and 76 are alined with the coin-egress opening 77 at the upper end of the chute 38. Extending inwardly along the face of the disk from the flange 74 is a projection 78 provided with a substantially radial edge, the surface 79 of which closely parallels the drum surface 70. As the drum is moved forward under the influence of the disk operated by its handle and an interposed coin, as just described, these surfaces 70 and 79 travel side by side but not necessarily in contact. Upon the return of the disk by its spring the surface 79 strikes 70 and restores the drum to its original position.

At what is normally the lower portion of the disk 54 is a recess 80, and outside of this the head adjacent to the flange 74 is cut away to furnish a slot 81 which is normally above a slug-egress opening 82 through the casing over the shelf 32. The portion of the flange inside the slot 81 and in the plane of the coin-egress opening has an inclined surface 83 (Fig. 12), adapted to deflect an object moving along the flange and striking it through the slot 81 and opening 82. When any object of less size than the proper coin is introduced into the ingress-opening, such object being termed a "slug" for the purposes of this invention, irrespective of its character or value, it falls between the surfaces 69 and 76 and into an enlarged space or passage below the surface 72 and between the opposite faces of the drum and disk, the surface 73 and the flange 74, through which space it passes freely until it contacts with the incline 83. This directs it from the plane of the coin-egress opening into the recess 80, entrance to which is facilitated by a beveled edge 84, and then through the slug-opening, from which it falls upon the shelf. It is thus returned to the user, giving warning that it is not suitable to effect the operation of the machine.

Let us suppose that my improved dispensing apparatus is to be employed for vending spring-water for which a charge of one cent a cup is to be made. The size of the opening through the tube 68 is therefore such that a cent will just enter it. When the machine is at rest (Figs. 1, 5, 7, 8 and 13) the inlet opening 43 admits water from the reservoir to the delivery-receptacle, but this is kept from flowing through the opening 50 by the ball 51. Assuming that the machine has been previously operated, a cup 26 will be already seated upon the holder 49, and the lower one of the nested series in the receiver will have its flange 27 resting upon the concentric edges of the drum-heads (Fig. 4). A person desiring to secure a cup of water inserts a cent 23 in the receiving tube and turns the handle 60 in a clock-wise direction. The engagement of the cent with the surfaces 69 and 76, causes the parts to travel as a unit, the actuating-disk driving the drum through the interposed coin. The first effect of the rotation of the drum, as the opening 43 passes out of alinement with the delivery-pipe, is to cut off the feed of water, leaving in the receptacle the quantity which is to be dispensed. The ball tends to cling to the opening 50 for some time after the holder has left its vertical position, but after the cup has been revolved through about ninety degrees the ball will begin to free itself (Fig. 2), and the water flows slowly into said cup. As the holder approaches its lowest point (Fig. 3), at which the handle is against the stop 65, the cup is inverted with respect to its original position upon the holder and brought over an opening from the bottom of the casing above the shelf. The weight is now sufficient to withdraw the cup from the holder, and it is therefore ejected from the casing and falls in an upright position upon the shelf. The delivery of the water is completed while the cup is falling and immediately after it reaches the shelf. The delivery of the cup and contents having been completed, the handle is released and the torsional stress of the spring 61 becomes effective and rotates the disk left-handedly. This frees the coin from its engagement with the surfaces 69 and 76, and now being opposite the slot 77 it falls through the chute 38 into the box 36. The disk surface 79 is now pressing against the drum surface 70 and this returns the drum to its initial position. At all times while either the drum or disk are away from their normal positions, the coin-ingress slot is closed by the flange 74. Therefore, nothing can be introduced at such times to interfere with the operation of the machine. As the reverse movement is taking place the flange of the lowermost cup of the stack contained in the receiver, and which is next to be transferred to the shelf, is located between the narrow portions of the drum heads and is caught by the eccentric grooves 53, while the next cup of the series rides upon the wider portions of the heads (Fig. 14). The divergence of the grooves and edges of the heads draws the terminal cup downward and separates it from its companions, and when the recess 46 reaches the cup the grooves have cleared it and it drops into place upon the holder. Any tendency to resist disengagement is overcome by a slight blow given to the cup-flange by the advancing rear portion of the recess-wall. The machine is now ready for another operation. If the handle of the machine is moved without a cent having been supplied to the slot 62, the actuating disk merely has an idle movement, the delivery-drum remaining stationary.

I claim:

1. A vending apparatus comprising a casing provided with coin-ingress and egress openings, a delivery device rotatable within the casing, and an actuating member rotatable in the casing independently of the delivery device and adapted to be connected thereto by a suitable coin inserted in the ingress opening, one of said rotatable elements having a projection furnishing a coin-engaging surface, while the other of the rotatable elements has a flange surrounding the projection and being provided with a coin-receiving opening.

2. A vending apparatus comprising a casing provided with coin-ingress and egress openings, a delivery device rotatable within the casing, and an actuating member rotatable in the casing independently of the delivery device and adapted to be connected thereto by a suitable coin inserted in the ingress opening, one of said rotatable elements having a projection furnishing a coin-engaging surface, while the other of the rotatable elements has a flange surrounding the projection and being provided with a coin-receiving opening, the flange at one extremity of its opening coöperating with the projection in the engagement of a coin.

3. A vending apparatus comprising a casing provided with coin-ingress and egress openings, a delivery device rotatable within the casing, and an actuating member rotatable in the casing independently of the delivery device and adapted to be connected thereto by a suitable coin inserted in the ingress opening, one of said rotatable elements having a projection furnishing a coin-engaging surface, while the other of the rotatable elements has a flange surrounding the projection and being provided with a coin-receiving opening and both elements having coöperating surfaces extending in the plane of the coin-ingress opening.

4. A vending apparatus comprising a casing provided with a coin-ingress opening, a delivery device and an actuating member therefor independently rotatable in the casing, said delivery device and actuating member having coin-engaging surfaces normally adjacent to the ingress opening and surfaces coöperating with one another upon reverse movement of the actuating member, and means for closing the ingress opening during the movement of the actuating member.

5. A vending apparatus comprising a casing provided with a coin-ingress opening, a delivery device and an actuating member therefor independently rotatable in the casing, said delivery device and actuating member having coin-engaging surfaces normally adjacent to the ingress opening and surfaces coöperating with one another upon reverse movement of the actuating member, and means for closing the ingress opening during the movement of the actuating member, one extremity of the closing means furnishing the coin-engaging surface of the actuating member.

6. The combination with a casing provided with coin-ingress and egress openings lying substantially in the same plane, of a delivery-drum and an actuating disk therefor having adjacent faces lying at opposite sides of the plane of the casing-openings, both the delivery-drum and actuating-disk being provided with separated coin-engaging surfaces projecting into the plane of the openings and also being provided with surfaces coöperating with one another, whereby the actuating disk returns the delivery drum to its initial position.

7. The combination with a casing provided with coin-ingress and egress openings lying substantially in the same plane, of a delivery-drum and an actuating disk therefor having adjacent faces lying at opposite sides of the plane of the casing-openings, both the delivery-drum and actuating disk being provided with separated coin-engaging surfaces projecting into the plane of the openings and also being provided with surfaces coöperating with one another, and an annular projection from the edge of the disk extending into the plane of the casing-openings and itself having an opening normally registering with the ingress opening.

8. The combination with a casing provided with coin-ingress and egress openings, of a delivery-drum and an actuating-disk having adjacent faces and an intermediate space communicating with the coin-openings, a projection from the drum into the space, said projection having a surface normally situated adjacent to one side of the coin-ingress slot and another surface spaced from that first mentioned, a projection near the periphery of the actuating-disk into the space at the opposite side of the coin-ingress opening from the corresponding surface upon the drum, and a second projection from the disk which coöperates with the other surface of the drum projection.

9. The combination with a casing provided with coin-ingress and egress openings, of a delivery-drum and an actuating-disk having adjacent faces and an intermediate space communicating with the coin-openings, a projection from the drum into the space, said projection having a surface normally situated adjacent to one side of the coin-ingress slot, and an annular flange near the periphery of the actuating disk surrounding the space between the faces and having an opening normally in alinement with the ingress opening.

10. The combination with a casing provided with coin-ingress and egress openings and a separate slug-egress opening, of a delivery-drum and an actuating disk having adjacent faces situated at opposite sides of the openings and furnishing an intermediate space, the face of the disk having a recess normally located opposite the slug-egress opening, a projection from the drum into the space, said projection having a surface normally situated adjacent to one side of the coin-ingress opening, and an annular flange near the periphery of the actuating-disk surrounding the space between the faces and having an opening normally in alinement with the coin-egress opening and being provided with a surface adjacent to and inclined toward the slug-egress opening.

Signed at Boston, in the county of Suffolk and State of Massachusetts, this eighteenth day of August, 1908.

LAWRENCE W. LUELLEN.

Witnesses:
  AUSTIN M. PINKHAM,
  SYLVANUS H. COBB.